United States Patent
Wei et al.

(10) Patent No.: US 11,419,033 B2
(45) Date of Patent: Aug. 16, 2022

(54) METHODS, WIRELESS COMMUNICATIONS NETWORKS AND INFRASTRUCTURE EQUIPMENT

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/253,139

(22) PCT Filed: Jun. 12, 2019

(86) PCT No.: PCT/EP2019/065380
§ 371 (c)(1),
(2) Date: Dec. 17, 2020

(87) PCT Pub. No.: WO2019/243137
PCT Pub. Date: Dec. 26, 2019

(65) Prior Publication Data
US 2021/0266815 A1    Aug. 26, 2021

(30) Foreign Application Priority Data
Jun. 19, 2018  (EP) .................................... 18178593

(51) Int. Cl.
H04W 40/12    (2009.01)
H04W 28/02    (2009.01)

(52) U.S. Cl.
CPC ....... H04W 40/12 (2013.01); H04W 28/0268 (2013.01)

(58) Field of Classification Search
CPC . H04W 40/12; H04W 28/0268; H04W 36/30; H04W 40/02; H04W 88/14;
(Continued)

(56) References Cited

U.S. PATENT DOCUMENTS

2021/0084506 A1* 3/2021 Kimba Dit Adamou .................... H04W 24/04
2021/0243672 A1* 8/2021 Deshmukh ............ H04W 40/22

FOREIGN PATENT DOCUMENTS

| WO | 2009/014764 A1 | 1/2009 |
| WO | 2011/110229 A1 | 9/2011 |
| WO | 2012/087206 A1 | 6/2012 |

OTHER PUBLICATIONS

International Search Report and Written Opinion dated Oct. 31, 2019, received for PCT Application No. PCT/EP2019/065380, Filed on Jun. 12, 2019, 16 pages.
(Continued)

*Primary Examiner* — Khaled M Kassim
*Assistant Examiner* — Najeeb Ansari
(74) *Attorney, Agent, or Firm* — Xsensus LLP

(57) ABSTRACT

A method of controlling communications within a wireless communications network is provided. The method comprises receiving, at a first of the infrastructure equipment acting as a donor node connected to a core network part of a wireless communications network, signals representing data from a second of the infrastructure equipment over a first communications path via one or more other infrastructure equipment acting as relay nodes, receiving, at the first infrastructure equipment, assistance information from at least one of the second infrastructure equipment and the one or more other infrastructure equipment acting as the relay nodes, and determining, by one of the first infrastructure equipment and the one or more other infrastructure equipment acting as the relay nodes in the case that the assistance information satisfies a trigger condition, that the second infrastructure equipment should communicate with the first infrastructure equipment over a second communications path.

11 Claims, 11 Drawing Sheets

(58) Field of Classification Search
CPC ..... H04W 92/24; Y02D 30/70; H04L 45/125; H04L 45/22
See application file for complete search history.

(56) References Cited

OTHER PUBLICATIONS

Teyeb et al., "Dynamic Relaying in 3GPP LTE-Advanced Networks", Eurasip Journal on Wireless Communications and Networking, vol. 2009, Article ID 731317, pp. 1-11.
Huawei, "Destination Address and Forwarding Path based Routing for IAB", 3GPP TSG-RAN WG3 Meeting No. 99, R3-180816, Feb. 26-Mar. 2, 2018, pp. 1-4.
Nokia et al., "Architecture and Protocols: Connectivity Service Solution for IAB", 3GPP TSG-RAN WG3 Meeting No. 100, R3-182842, Release 15, May 21-25, 2018, 10 pages.
Holma et al. "LTE for UMTS OFDMA and SC-FDMA Based Radio Access", Wiley, System Architecture Based on 3GPP SAE, 2009, pp. 25-27.
Qualcommm et al., "Proposals on IAB Architecture", 3GPP TSG-RAN WG2 NR Ad hoc 1801, R2-1801606, Jan. 22-26, 2018, 7 pages.
Huawei et al., "Topology Management for IAB", 3GPP TSG-RAN WG3 Meeting No. 99, R3-180817, Feb. 26-Mar. 2, 2018, pp. 1-4.
Qualcommm et al., "Way Forward—IAB Architecture for L2/3 Relaying", 3GPP TSG-RAN WG3 Meeting No. 99, R3-181502, Jan. 26-Mar. 2, 2018, 6 pages.
Huawei et al., "Revised Work Item Proposal: Enhancements of NB-IoT", 3GPP TSG RAN Meeting No. 73, RP-161901 revision of RP-161324, Sep. 19-22, 2016, 7 pages.
AT&T et al., "New SID Proposal: Study on Integrated Access and Backhaul for NR", 3GPP TSG RAN, Meeting No. 75, RP-170821, Mar. 6-9, 2017, 5 pages.
3GPP, "3rd Generation Partnership Project; Technical Specification Group Radio Access Network; Study on Integrated Access and Backhaul", Release 15, 3GPP TR 38.874 V0.1.0, Feb. 2018, pp. 1-11.

\* cited by examiner

METHODS, WIRELESS COMMUNICATIONS NETWORKS AND INFRASTRUCTURE EQUIPMENT

CROSS-REFERENCE TO RELATED APPLICATIONS

The present application is based on PCT filing PCT/EP2019/065380, filed Jun. 12, 2019, which claims priority to EP 18178593.2, filed Jun. 19, 2018, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment.

SUMMARY OF THE DISCLOSURE

The present disclosure can help address or mitigate at least some of the issues discussed above as defined in the appended claims.

Embodiments of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises receiving, at a first of the infrastructure equipment acting as a donor node connected to a core network part of the wireless communications network, signals representing data from a second of the infrastructure equipment over a first communications path via one or more others of the infrastructure equipment acting as relay nodes, receiving, at the first infrastructure equipment, assistance information from at least one of the second infrastructure equipment and the one or more other infrastructure equipment acting as the relay nodes, determining, by one of the first infrastructure equipment and the one or more other infrastructure equipment acting as the relay nodes in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, transmitting, by the one of the first infrastructure equipment and the one or more other infrastructure equipment acting as the relay nodes which determined that the second infrastructure equipment should communicate with the first infrastructure equipment over the second communications path, a route change command to the second infrastructure equipment indicating that the second infrastructure equipment should communicate with the first infrastructure equipment over the second communications path instead of the first communications path, and communicating, by the first infrastructure equipment, with the second infrastructure equipment over the second communications path.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
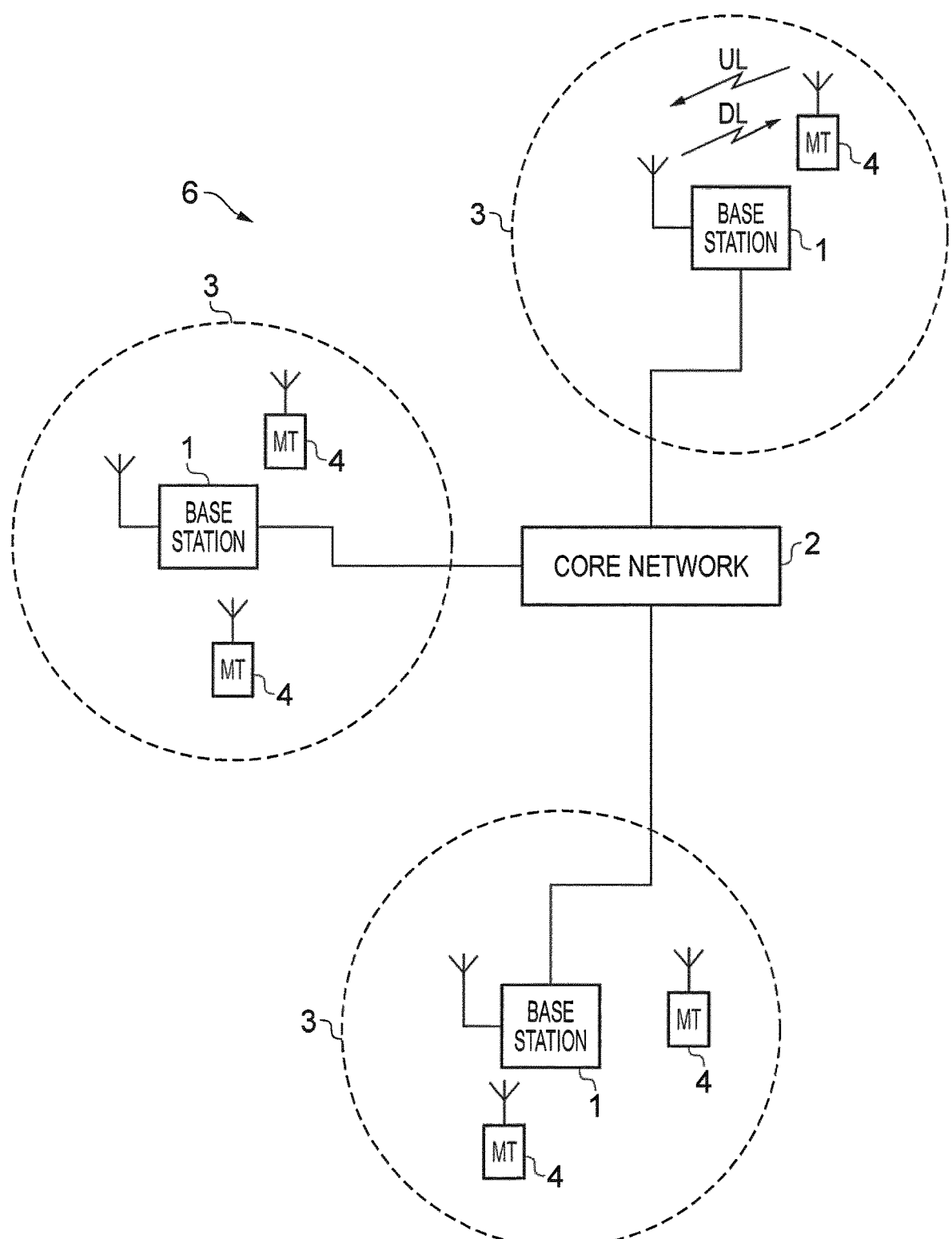
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
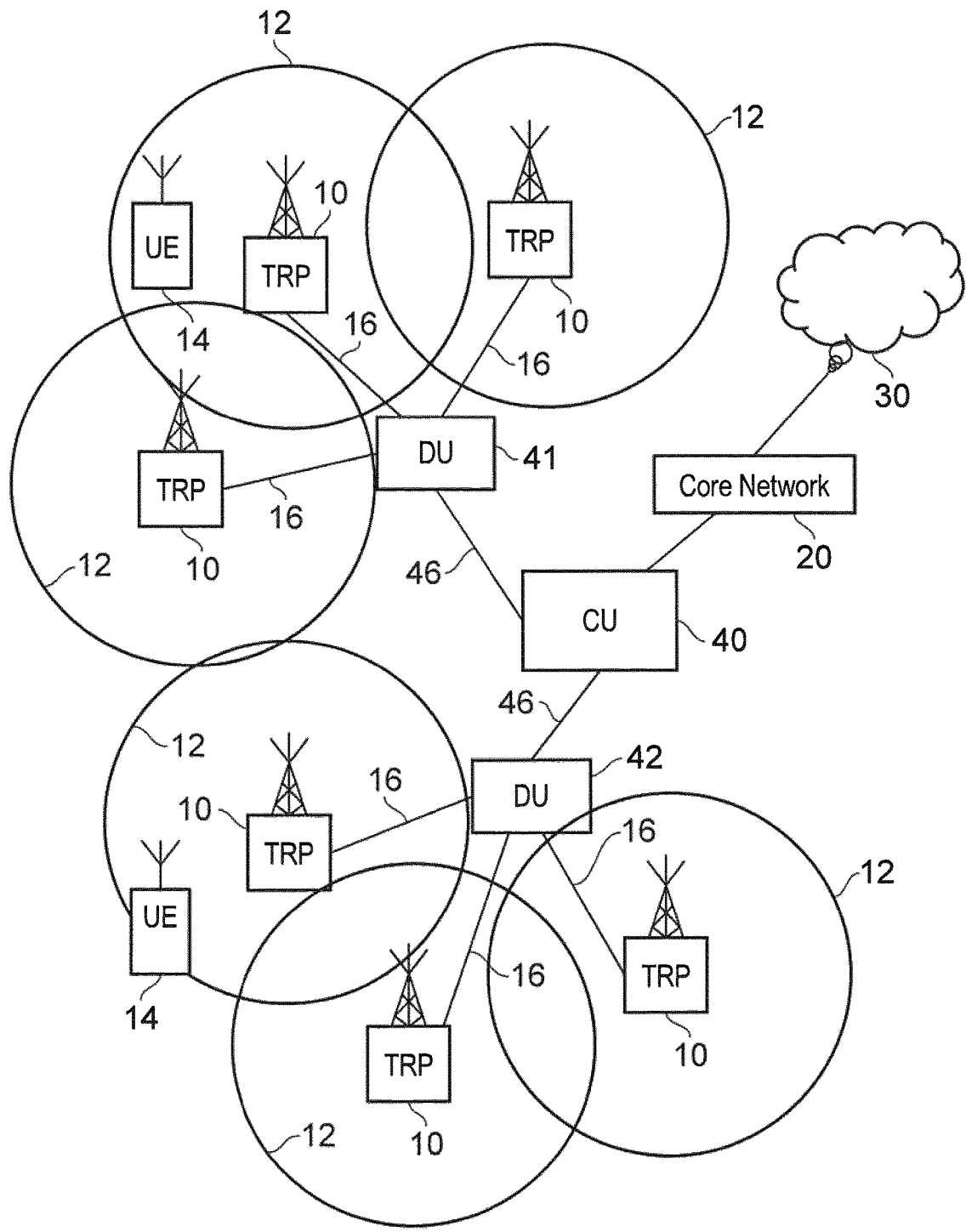
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
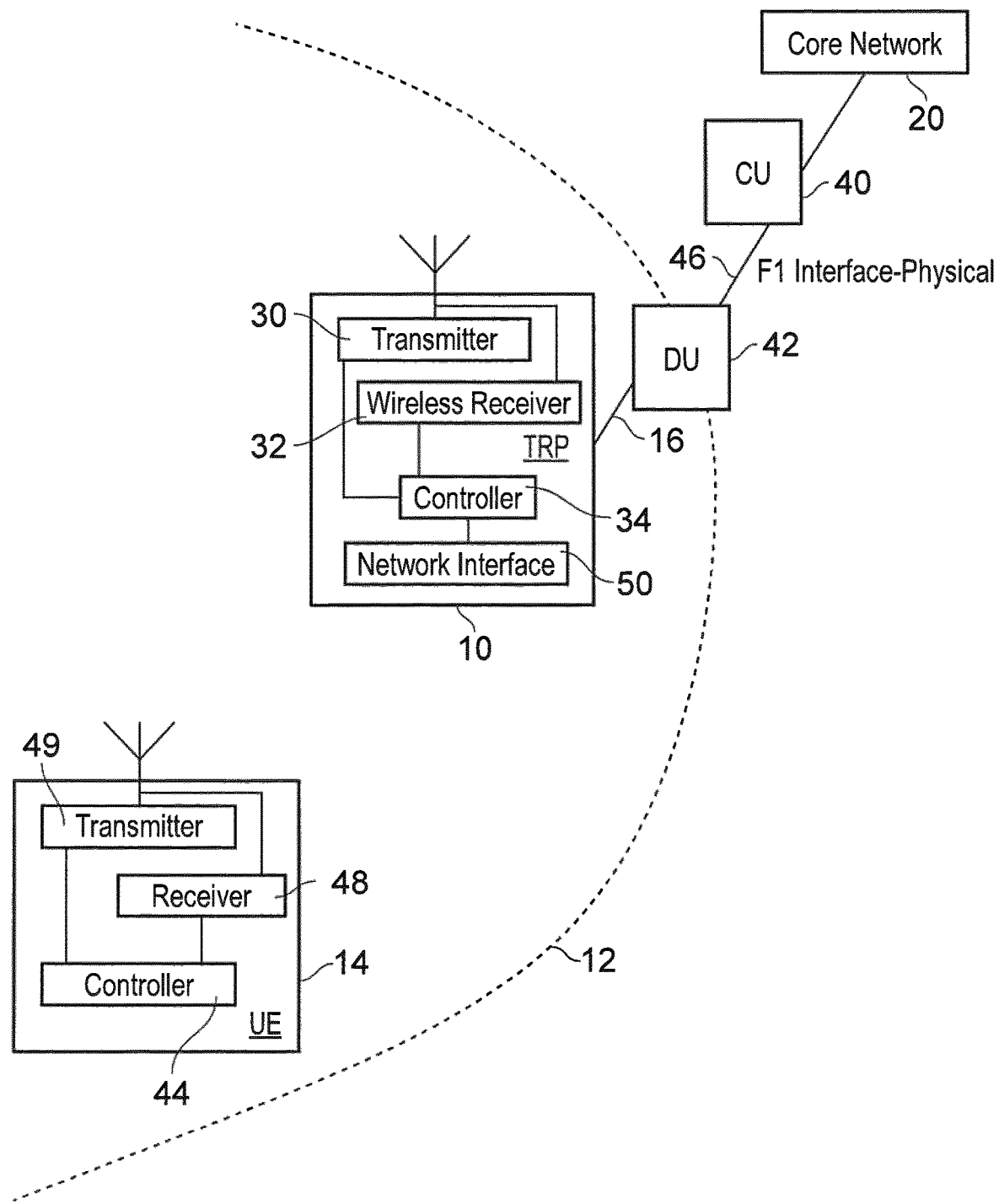
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 4448 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
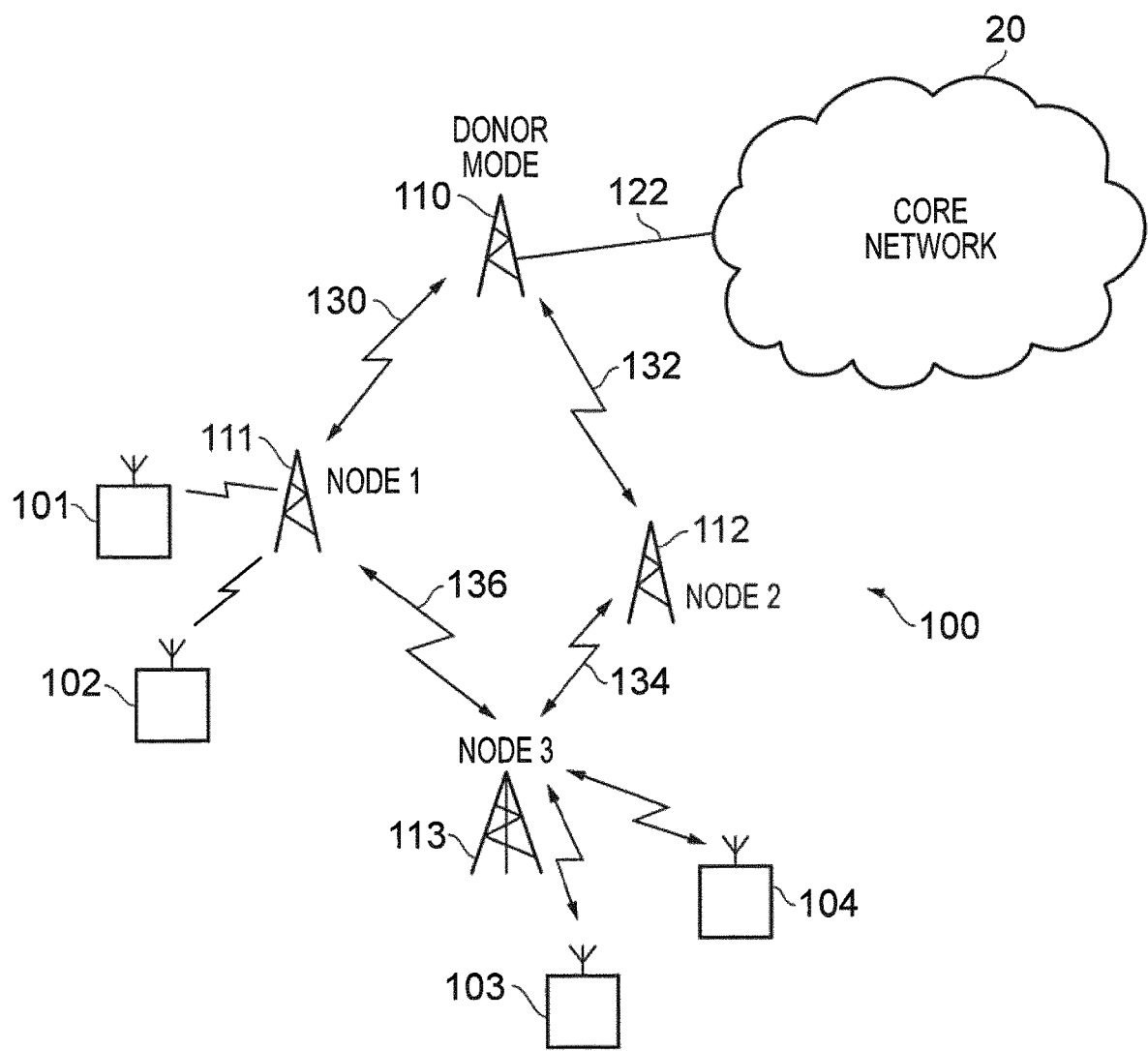
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink data from a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
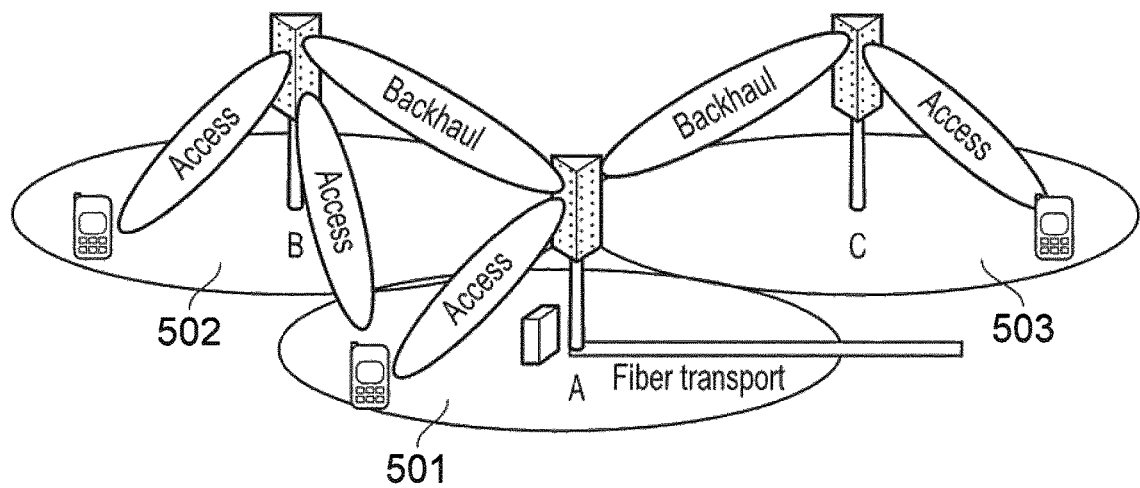
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6:
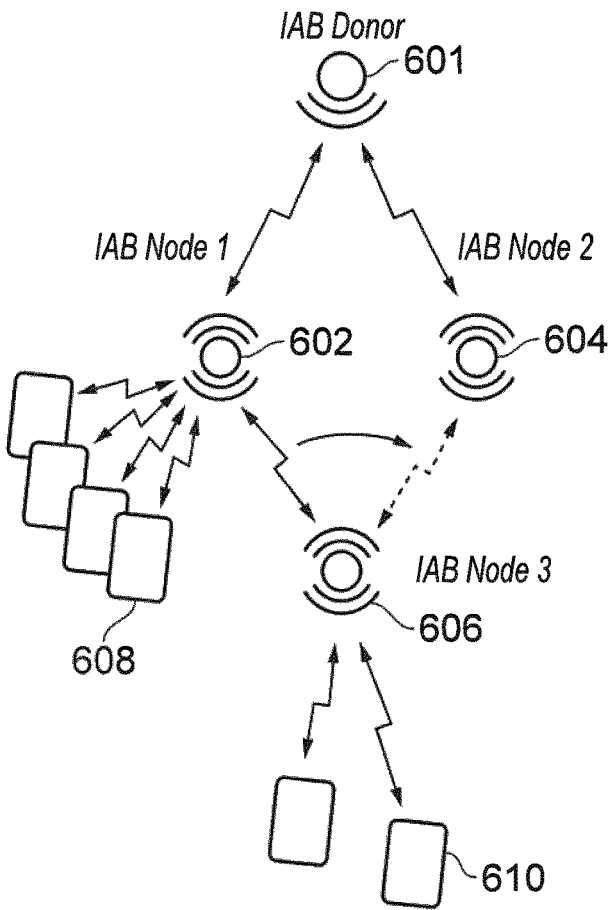
FIG. 6 is reproduced from [5], and provides a second example of an IAB deployment scenario in which there are multiple candidate routes each comprising multiple hops from the end node to the donor node.

FIG. 6 is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6 is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
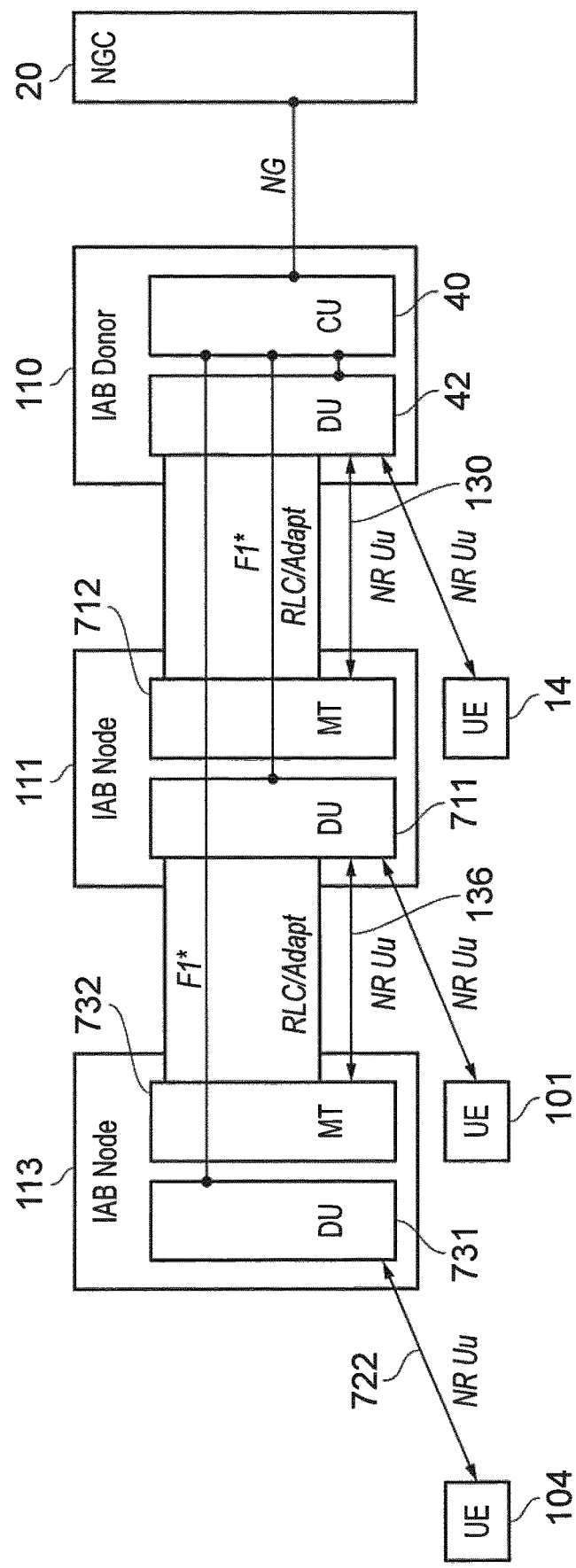
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
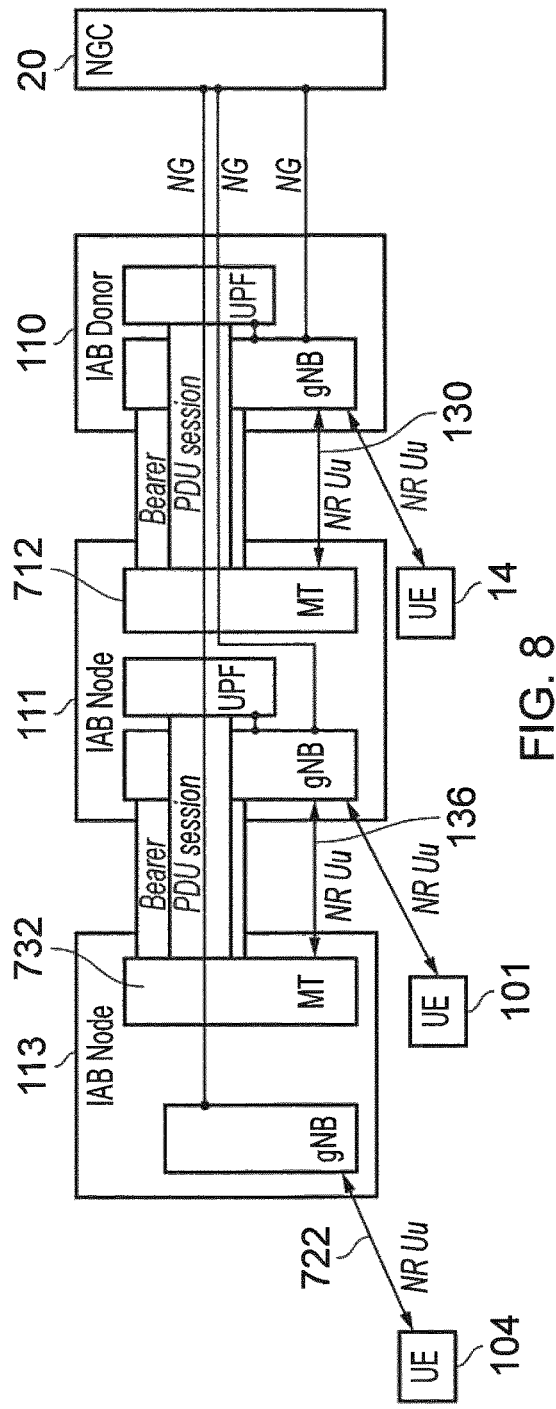
FIG. 8 is a block diagram illustrating a second possible network architecture for providing a wireless backhaul by means of IAB in a wireless telecommunication network which may be configured to operate in accordance with certain embodiments of the present disclosure.
Figure 9:
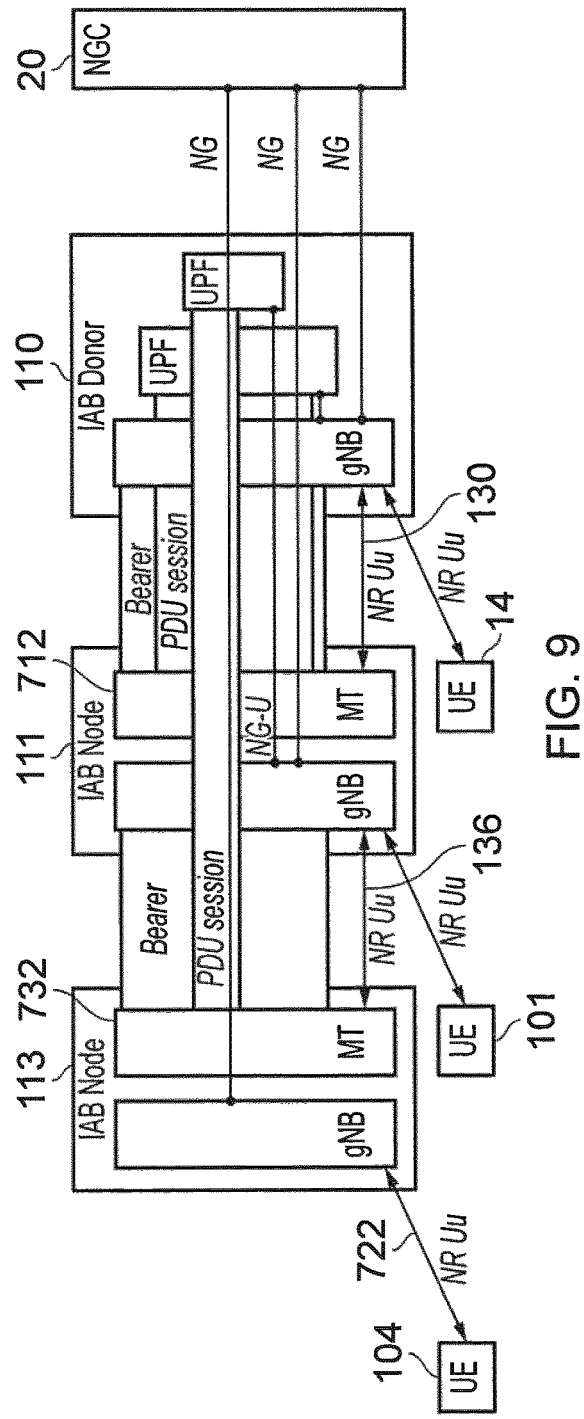
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Given the vulnerable characteristics of wireless links, and considering multi-hops on the backhaul link, topology adaptation should be considered in the case that blockages or congestion occur in the backhaul link considering a given hop. It is therefore imperative to maximise the spectral efficiency of the backhaul link in order to maximise its capacity. Embodiments of the present technique seek to address the route change procedure; i.e. how, following a decision on a route change procedure, to carry out the route change procedure, hence enabling an efficient topology management.

There are many challenges to overcome and aspects to consider when providing such route change procedure solutions. Firstly, it must be determined how problems with routes are detected and how measurement reports and/or assistance information may be used to decide when routes should be changed with respect to the intermediate nodes. Such problems may include link quality deterioration of the route as a whole or at one or more of the nodes on the route, traffic loads at one or more of the nodes on the route, or capacity issues or a node status at one or more of the nodes on the route, such as a buffer status or a power headroom status. Secondly, the way in which route selection criteria and decision making must be determined. This includes the route selection meeting any QoS requirements, the securing of capacity, reserving of resources, admission control requirements and means by which the route can be adapted or simplified. Thirdly, it must be determined how the selected links or updated routes are indicated to the relevant nodes in the system. For example, an indication of a route change may be provided to all or a part of intermediate nodes on both the old route and the new route.

As described above with respect to FIGS. 7 to 9, different IAB architectures are proposed. Depending on the architecture, the route reselection and change may require different procedures (i.e. message flows). For example, this may depend on whether or not the intermediate nodes have an RRC layer. As described above with relation to FIG. 6, one of the nodes in a system will need to make a decision to change a route between two nodes when the link between these nodes is deteriorating, or one of the nodes becomes overloaded. Embodiments of the present technique seek to provide solutions to how the signalling to realise this procedure may be designed.

Route Change Procedure in IAB

Figure 10:
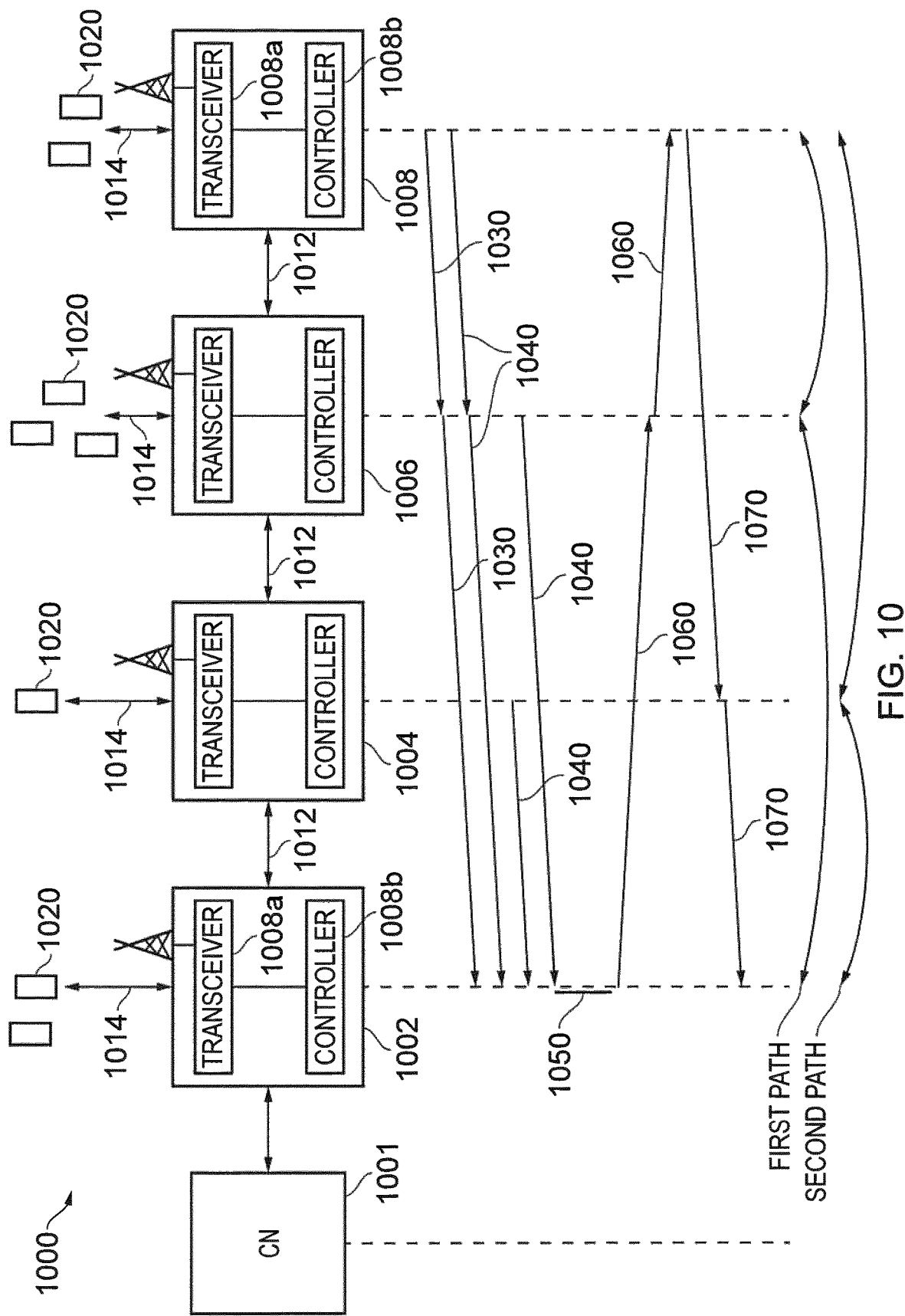
FIG. 10 shows a part schematic, part message flow diagram of communications in a wireless communications system in accordance with embodiments of the present technique.

FIG. 10 shows a part schematic, part message flow diagram of communications in a wireless communications network 1000 in accordance with embodiments of the present technique. The wireless communications network 1000 comprises a plurality of infrastructure equipment 1002, 1004, 1006, 1008 each being configured to communicate with one or more others of the infrastructure equipment 1002, 1004, 1006, 1008 via a backhaul communications link 1012, one or more of the infrastructure equipment 1002, 1004, 1006, 1008 each being configured to communicate with one or more communications devices 1020 via an access link 1014.

A first of the infrastructure equipment 1002 is configured to act as a donor node connected to a core network part 1001 of the wireless communications network 1000 and comprises transceiver circuitry 1002a and controller circuitry 1002b configured in combination to receive 1030, at the first infrastructure equipment 1002, signals representing data from a second of the infrastructure equipment 1008 over a first communications path via one or more others of the infrastructure equipment acting as relay nodes 1006, and to receive 1040 assistance information (and/or measurement reports) from at least one of the second infrastructure equipment 1008 and the one or more other infrastructure equipment acting as the relay nodes 1004, 1006, wherein one of the first infrastructure equipment 1002 and the one or more other infrastructure equipment acting as the relay nodes 1006 is configured to determine 1050, in the case that the assistance information (and/or measurement reports) satisfies a trigger condition, that the second infrastructure equipment 1008 should communicate with the first infrastructure equipment 1002 over a second communications path via one or more other of the infrastructure equipment acting as relay nodes 1004, the second communications path being different to the first communications path, and to transmit 1060 a route change command to the second infrastructure equipment 1008 indicating that the second infrastructure equipment 1008 should communicate with the first infrastructure equipment 1002 over the second communications path instead of the first communications path, wherein the first infrastructure equipment 1002 is configured to communicate 1070 with the second infrastructure equipment 1008 over the second communications path.

Route Change Procedure via F1 Interface

The trigger of the route change, for example referring to the example of FIG. 6, the route may change from the third IAB node 606—the first IAB node 602—the IAB donor node 601 to the third IAB node 606—the second IAB node 604—the IAB donor node 601, could be from a link degradation, or a node blockage etc. So, the data transfer needs to change from the first IAB node 602 to the second IAB node 604. In relation to the example wireless communications network 1000 of FIG. 10, the IAB donor node 601 is equivalent to the first infrastructure equipment 1002, the first IAB node 602 is equivalent to the infrastructure equipment acting as the relay node 1006, the second IAB node 604 is equivalent to the infrastructure equipment acting as the relay node 1004, and the third IAB node 606 is equivalent to the second infrastructure equipment 1008. The route change decision can be made by a central node e.g. the IAB donor node 601.

In architecture 1a, as shown in FIG. 7, the RRC layer resides in the IAB donor, so in principle, the RRC signalling will be transmitted via the F1 interface between CU and DU (labelled with reference numerals 40 and 42 in the example of FIG. 6) and will be forwarded hop by hop physically. In other words, the first infrastructure equipment may be configured to transmit the route change command to the second infrastructure equipment using an F1 interface. Furthermore, the first infrastructure equipment may be configured to transmit, subsequent to determining that the second infrastructure equipment should communicate with the first infrastructure equipment over the second communications path, signalling associated with the route change command to each of the infrastructure equipment on the first communications path and to each of the infrastructure equipment on the second communications path.

The trigger of the route change may be one of a number of factors, such as:

1) The link quality is getting worse;
2) The link can't guarantee the QoS requirement (for example delay requirement);
3) The relay node is overloaded; or
4) The route selection criterion is changed, for example to minimise the hop count so as to maximise network capacity.

In other words, the trigger condition comprises a determination, based on the assistance information (and/or measurement reports), that a link quality between two of the infrastructure equipment on the first communications path is below a threshold link quality. Alternatively, the trigger condition comprises a determination, based on the assistance information, that at least one quality of service requirement cannot be guaranteed by at least one of the infrastructure equipment on the first communications path. Alternatively, the trigger condition comprises a determination, based on the assistance information, that a load at one of the infrastructure equipment on the first communications path is above a threshold load. Alternatively, the trigger condition comprises a determination, based on the assistance information, that at least one route selection criterion has changed.

Once the route change decision has been made, the route change procedure should be assisted by a central node, i.e. the donor node, and the route change signalling may need to be forwarded layer by layer physically. The route change procedure may be that as shown in FIG. 11, which is a message flow diagram illustrating an example of a route change procedure via the F1 interface in accordance with embodiments of the present disclosure.

Figure 11:
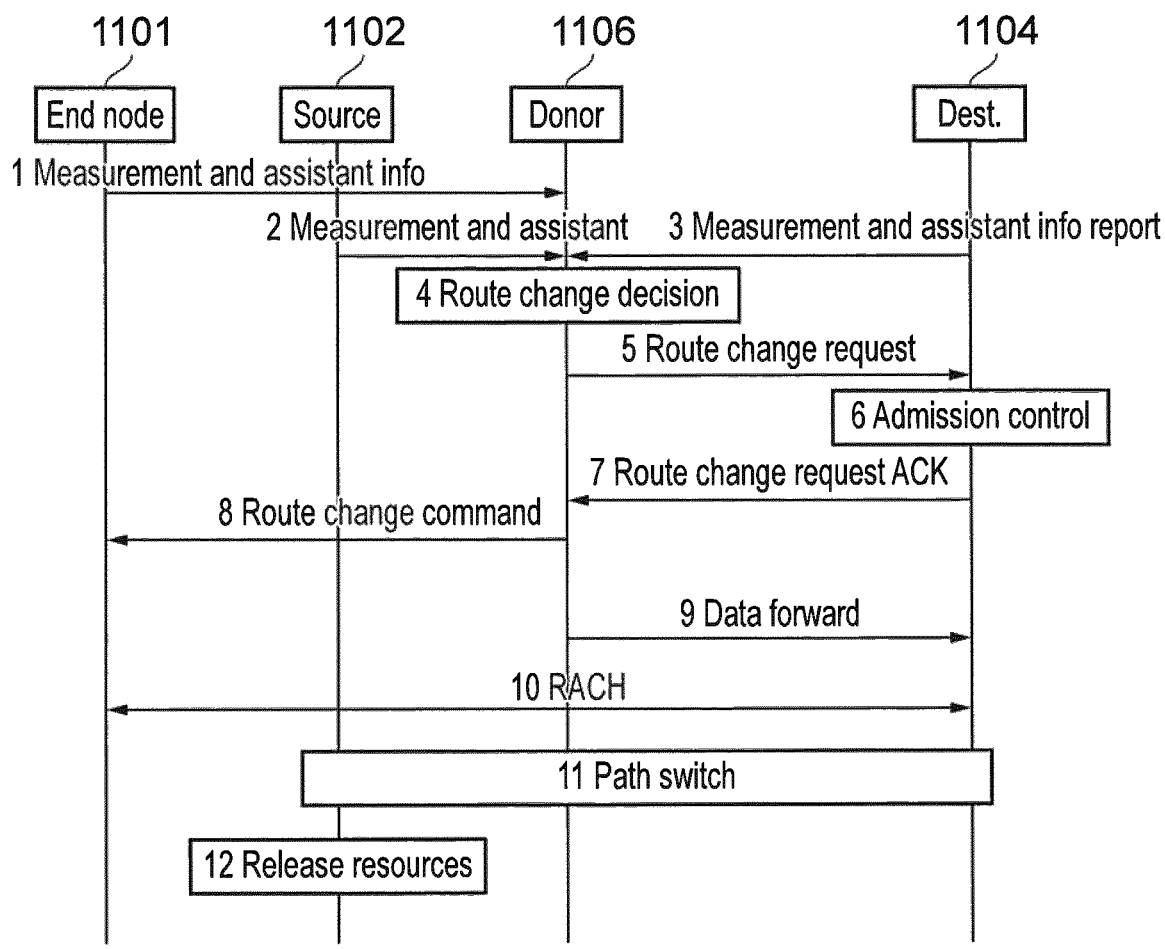
FIG. 11 is a message flow diagram illustrating an example of a route change procedure via the F1 interface in accordance with embodiments of the present disclosure.

In FIG. 11, the end IAB node 1101 is that which needs to change the route from one to the other (e.g. the third IAB node 606 of FIG. 6 or second infrastructure equipment 1008 of FIG. 10). The source IAB node 1102 is that which is on the original route, and needs to be changed (e.g. the first IAB node 602 of FIG. 6 or the infrastructure equipment acting as the relay node 1004 of FIG. 10). The destination IAB node 1104 is that which is on the destination route, and needs to be changed to (e.g. the second IAB node 604 of FIG. 6 or the infrastructure equipment acting as the relay node 1006 of FIG. 10). The donor node/central IAB node 1106 is that which made the route change decision and/or assisted the route change procedure (e.g. the IAB donor node 601 of FIG. 6 or first infrastructure equipment 1002 of FIG. 10). The procedure shown in FIG. 11 is as follows:

1. Step 1: The end node will send assistance info, e.g. measurement report, load report etc. to IAB donor via F1 interface. It should be noted that such assistance information will be forward physically via intermediate nodes.
2. Step 2&3: The intermediate nodes may need to send their own assistance information as well as forward the assistance information from its downstream nodes.
3. Step 4: The donor node will make a route change decision based on the received assistance information and its up-to-date active police, if necessary.
4. Step 5: The donor will send a route change request to the candidate destination relay node. The information may include RRC context including the C-RNTI of the end node, destination node ID, QoS requirement etc.
5. Step 6: The destination node will make admission control and decide whether to accept the route change request or not. Admission control may include access evaluation, security check, and resource reservation/configuration for allowed routes etc.
6. Step 7: If the destination node accepts the change request, it will send a route change request ACK to donor node. It may include a transparent container to be sent to the end node as an RRC message to perform the route change. It may include a new C-RNTI, a dedicated RACH preamble (if necessary) or any other access parameters, such as a reserved resource pool etc.
7. Step 8: The donor node will generate the route change message, e.g. a RRC message, including the transparent container prepared by the destination node to the concerned end node via the F1 interface. The message may need to be forwarded physically via intermediate nodes to the end node. The donor may include the SIB of the destination node in the route change message as well. This route change command will be transparent to the intermediate nodes.
8. Step 9: The donor will forward the data for the end node to the destination node.
9. Step 10: The end node will perform a RACH to the destination node.
10. Step 11: Path switch from source to destination node. The timing of the switch may be indicated by the donor gNB to avoid the packet loss/service disruption.
11. Step 12: The resources for the end node in the source node will be released, as these are no longer needed following the path change to the destination node.

It should be noted that the donor node may need to access the core network for some additional assistance information in order to finish the route change procedure. It should also be noted that the data path and control data path could be different. There could be a special control signalling route to deliver the route change signalling for example, in order to guarantee the signalling reliability.

Example of Measurements and Assistance Information

In terms of the measurement information/assistance information received at the donor node from various other nodes in the system, this information may include indications of:

Link quality:
    Link quality between source node and end point node;
    Link quality between nodes and donor gNB (if there is);
    Link quality between end point node and neighbour nodes;
Traffic load:
    The processing load of own node (e.g. baseband/power headroom);
    Link between own (source node) and donor (or next hop), the link capacity and current traffic;
Node status:
    Power headroom;
    Buffer status;
    CQI (channel quality);
    CSI (channel status for MIMO/beamforming);
    Battery lifetime;
    Node position (i.e. is this fixed position or mobile);
Node capability/link characteristic (static):
    Wireless/optical fibre link;
    Band/mmWave;
    Duplex, TDD/FDD.

The donor node may itself make measurements, which may be taken into account in the route change decision of step 4. These may include:

Link quality:
    Link quality between source node and donor node;
Traffic load:
    Link between own (donor node) and connected nodes.

The NR backhaul link in future implantations may make use of new wireless technologies like massive MIMO/beamforming and mmWave. In other words, if beamforming is used with respect to embodiments of the present technique, one or more of the plurality of infrastructure equipment are configured to communicate with one or more others of the infrastructure equipment via the backhaul communications link using one or more beams in which power of each of the signals is focussed, each of the one or more beams being separately identifiable and forming a directional bias with respect to the one or more of the plurality of infrastructure equipment. It is worth noting the following characteristics of the NR wireless link:

In mmWave (i.e. >6 GHz):
    Advantages/general characteristics:
        The massive number of antennas in the antenna array (e.g. 256) which can facilitate the use of a massive number of space multiplexing with high capacity;
        Beamforming or directional antenna with narrow beam, which has as a result a low cross link interference;
        Mainly TDD operation and channel reciprocity can be exploited;
        Easier to secure large bandwidth, high capacity.
    Disadvantages:
        Vulnerable of objects in the path of signals (i.e. non-line of site) or weather conditions like rain/snow because of radio propagation characteristics.

In low band (i.e. <6 GHz):
  Advantages/general characteristics:
    The limited number of antennas in the antenna array (e.g. 32) which allows the use of various options of MIMO/beamforming (e.g. rank adaptation);
    Propagation, smaller penetration loss;
    Both FDD and TDD duplex are used;
    Potentially unlicensed band use for limited areas (e.g. a home);
  Disadvantages:
    susceptible to interference with macro cells/neighbour small cells;
    narrower bandwidth/limited capacity;
    temporary restriction of band (e.g. 3.5 GHz) for license shared access (LSA) sites to avoid the interference with other system.

Route Selection Strategy

In general, multi-hopping relay networks have various links between nodes, and various combinations of routes. As a result, much signalling is likely to be redundant. It is important to keep the volume of signalling at a moderate level, which can be achieved through the strategy of candidate link reduction.

Firstly, the type of backhaul link must be classified. A first type of link is one which is stable with a large capacity, and this is referred to as a "highway link" in this disclosure. A second type of link is one which is more unstable/volatile, and might be a bottleneck in terms of capacity. This is referred to in this disclosure as a "normal link" or a "local link".

A highway link may be one of:
A relay installed at fixed position;
A link where directive antennas/narrow beamforming is used;
One where the antenna height is high for guarantee line of site (LOS); or
A link with no capacity bottleneck, such as mmWave or optical fibre.

Secondly, the strategy of topology is considered, where highway links and local links may be mixed. The number of hops between an end point node and the entrance of a highway link could be minimised. Optionally, although measurement reports are not transmitted, the highway link may be regularly checking the link status (e.g. using a loop back test), and may redirect to alternative routes if necessary.

Figure 12:
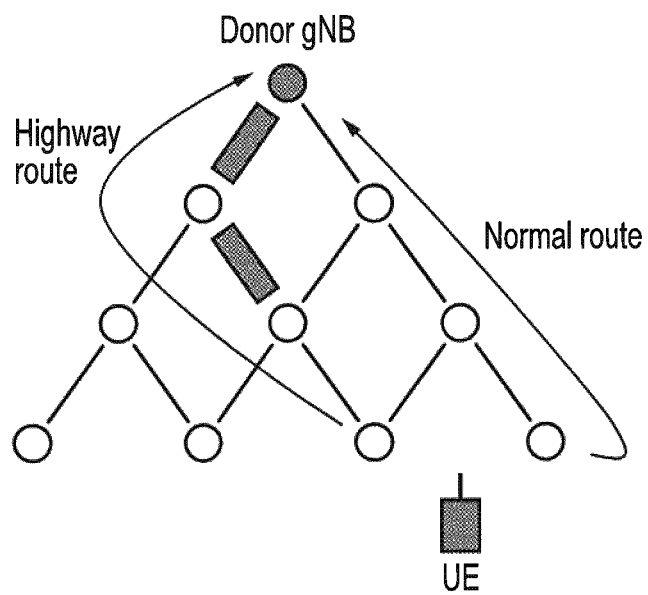
FIG. 12 shows an example of highway links being utilised as part of route selection between nodes in accordance with embodiments of the present disclosure.

The highway link should be one of a default link or a high priority link in an IAB network in terms of having a stable link quality, a large capacity and a low latency. FIG. 12 shows an example of how a highway link may be used. The connection between the UE and the donor gNodeB may be more than one. The left hand side highway route has a shorter path to the entrance of the highway. The UE and any intermediate nodes may narrow down the measurement reports based on the entrance of the highway. In other words, the measurement reports related to the highway could be omissible or could be less frequent.

If a highway link is used with respect to embodiments of the present technique, wherein if the first communications path is either of a default communications path or a high priority default communications path, the first infrastructure equipment is configured to receive less assistance information from the infrastructure equipment on the first communications path than if the first communications path was not either of a default communications path or a high priority communications path.

Route Change Procedure via RRC Signalling

In architecture 2a, as shown in FIG. 8, the RRC layer resides in the gNodeB part of the IAB node, so in principle, an RRC layer on each IAB node will be responsible for the route change procedure. In other words, the one of the one or more other infrastructure equipment acting as the relay nodes may be configured to transmit the route change command to the second infrastructure equipment using radio resource control, RRC, signalling. Furthermore, any of the infrastructure equipment on the first communications path and the infrastructure equipment on the second communications path may be configured to determine that the second infrastructure equipment should communicate with the first infrastructure equipment over the second communications path.

Figure 13:
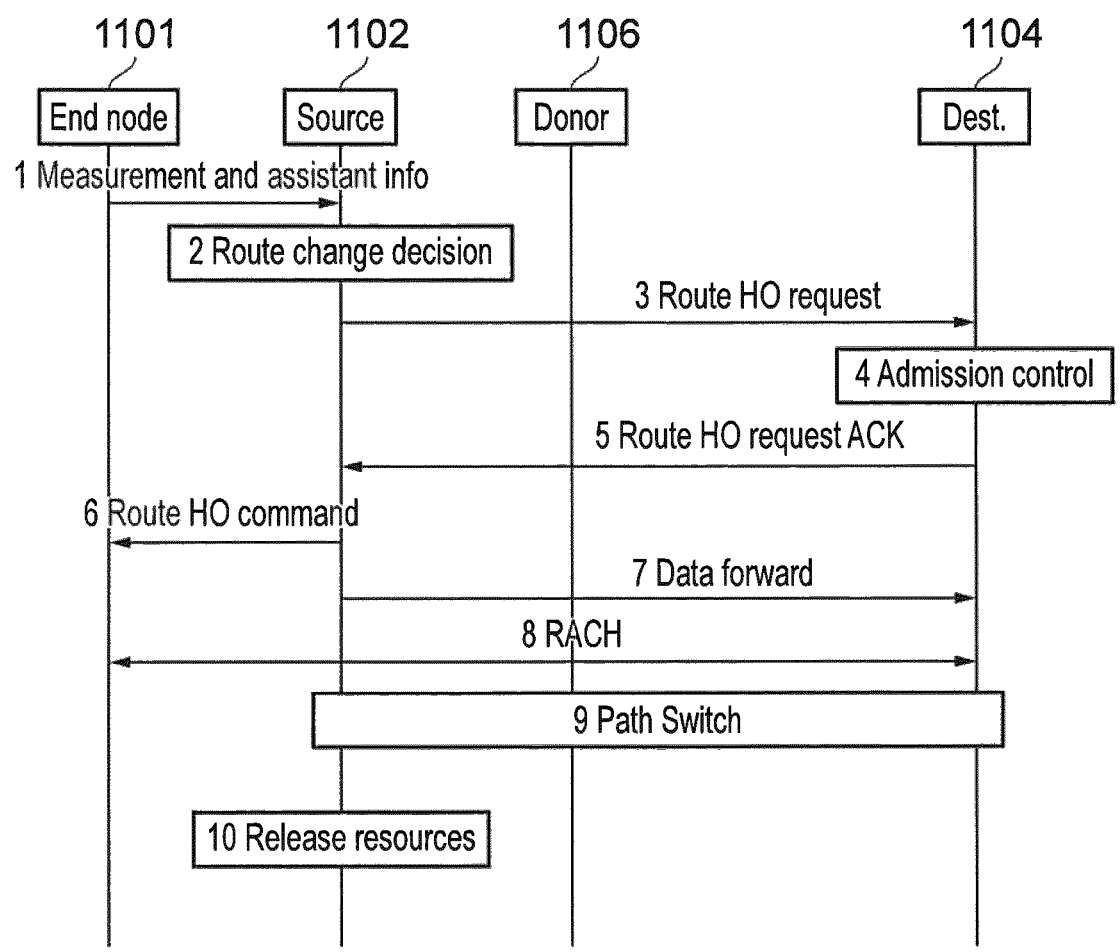
FIG. 13 is a message flow diagram illustrating an example of a route change procedure using radio resource control (RRC) signalling in accordance with embodiments of the present disclosure.

The route change procedure may be that as shown in FIG. 13, which is a message flow diagram illustrating an example of a route change procedure using radio resource control (RRC) signalling in accordance with embodiments of the present disclosure. Much of the procedure shown by FIG. 13 is equivalent to that of FIG. 11, so for conciseness, FIG. 11 should be referred to for the understanding of FIG. 13.

However, the major differences between the procedures of FIGS. 11 and 13, aside from the source IAB node managing the procedure rather than the donor IAB node, lie in the steps of acknowledging (by the destination IAB node) the route handover request (step 5) and the path switch process (step 9). These are detailed below.

Step 5: If the destination node accepts the route change request, the user plane function (UPF) in the source node will re-locate to the destination node as per the requirements of architecture 2a. In other words, any of the infrastructure equipment on the first communications path and the infrastructure equipment on the second communications path may be configured to control a user plane function, UPF, to be relocated from one of the infrastructure equipment on the first communications path to one of the infrastructure equipment on the second communications path.

Step 9: This is the interaction with the core network (through the donor node), that creates a new interface between the destination node and the core network instead of the old interface between the source node and the core network. In other words, one of the infrastructure equipment on the second communications path may be configured to create a new access interface between the one of the infrastructure equipment on the second communications path and the core network part of the wireless communications network.

IAB Network Topology and Route Management

Several different topologies have been proposed for IAB, which are outlined in [7], which discusses the topologies generally without mentioning contents of measurement reports or assistance information. These topologies include:
  Tree based hierarchical topology;
  Arbitrary mesh based topology; and
  Directed acrylic graph based topology.

In the context of this disclosure, the definition of a hierarchy refers to a system in which IAB nodes are arranged with one or multiple hops via various other IAB nodes to the donor gNodeB. Embodiments of the present technique are applicable for any of the above topologies.

Multiple routing examples are also proposed for IAB, and shown in [8]. These include destination address based routing, and forwarding path based routing.

Forwarding path based routing as described in [8] is similar to the F1 interface based route change procedure as described in the present disclosure in relation to FIG. 11 above. The routing table may be configured in advance, especially for the uplink. In embodiments of the present technique, the donor gNodeB may collect all the information of links/nodes such as link quality, traffic load, etc. Then, the donor gNodeB will decide upon the route, and update the routing table accordingly. In addition, the gNodeB may indicate the switching time of the path switch, thus ensuring that the service disruption time or packet loss is minimized. In order to reduce the number of measurements reports, embodiments of the present technique introduce the highway link in order to reduce the degree of freedom for link selection.

Destination address based routing as described in [8] is similar to the RRC based route change procedure as described in the present disclosure in relation to FIG. 13 above. However, this destination address based routing as defined in [8] appears to be a connectionless type routing, like IP packet routing. In embodiments of the present disclosure, each intermediate node (or gNodeB) may carefully decide the routing table to meet the required QoS and service level. For example, the donor gNodeB may collect measurements of the candidate link qualities and capacities, and then the link which meets the necessary QoS is selected. Alternatively, intermediate nodes in the link may check the link quality and capacity between themselves and neighbor nodes (e.g. perform a loop back test). Then, the intermediate nodes themselves may decide to change the route to meet the QoS requirements.

Flow Chart Representation

Figure 14:
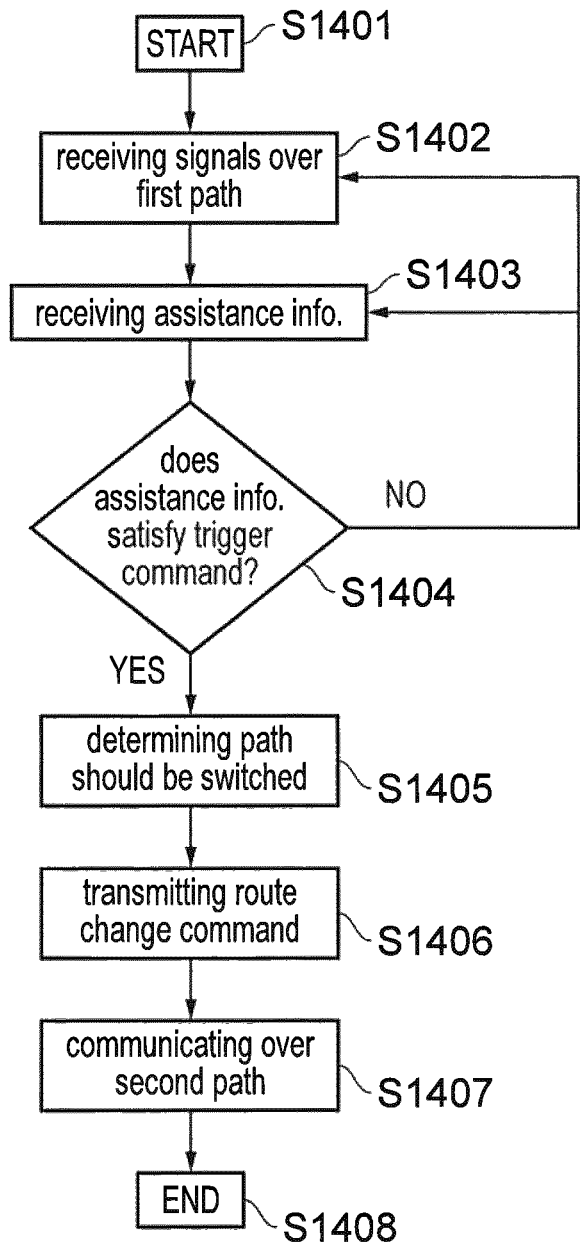
FIG. 14 shows a flow diagram illustrating a process of communications in a communications system in accordance with embodiments of the present technique.

FIG. 14 shows a flow diagram illustrating a process of communications in a communications system in accordance with embodiments of the present technique. The process shown by FIG. 14 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link.

The method begins in step S1401. The method comprises, in step S1402, receiving, at a first of the infrastructure equipment acting as a donor node connected to a core network part of the wireless communications network, signals representing data from a second of the infrastructure equipment over a first communications path via one or more others of the infrastructure equipment acting as relay nodes. The process then moves to step S1403, which comprises receiving, at the first infrastructure equipment, assistance information from at least one of the second infrastructure equipment and the one or more other infrastructure equipment acting as the relay nodes. In step S1404, the method comprises one of the first infrastructure equipment and the one or more other infrastructure equipment acting as the relay nodes determines whether or not the assistance information satisfies a trigger condition. If not, then the method moves back to either of steps S1402 and S1403. However, if the assistance information does satisfy the trigger condition, then the method advances to step S1405. In step S1405, the process comprises determining, by the one of the first infrastructure equipment and the one or more other infrastructure equipment acting as the relay nodes in the case that the assistance information satisfies the trigger condition, that the second infrastructure equipment should communicate with the first infrastructure equipment over a second communications path via one or more other of the infrastructure equipment acting as relay nodes, the second communications path being different to the first communications path. The method then moves to step S1406, which comprises transmitting, by the one of the first infrastructure equipment and the one or more other infrastructure equipment acting as the relay nodes which determined that the second infrastructure equipment should communicate with the first infrastructure equipment over the second communications path, a route change command to the second infrastructure equipment indicating that the second infrastructure equipment should communicate with the first infrastructure equipment over the second communications path instead of the first communications path, and in step S1407, communicating, by the first infrastructure equipment, with the second infrastructure equipment over the second communications path. The process ends in step S1408.

Those skilled in the art would appreciate that the method shown by FIG. 14 may be adapted in accordance with embodiments of the present technique. For example, other intermediate steps may be included in the method, or the steps may be performed in any logical order.

Though embodiments of the present technique have been described largely by way of the example system shown in FIG. 10, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising receiving, at a first of the infrastructure equipment acting as a donor node connected to a core network part of the wireless communications network, signals representing data from a second of the infrastructure equipment over a first communications path via one or more others of the infrastructure equipment acting as relay nodes, receiving, at the first infrastructure equipment, assistance information from at least one of the second infrastructure equipment and the one or more other infrastructure equipment acting as the relay nodes, determining, by one of the first infrastructure equipment and the one or more other infrastructure equipment acting as the relay nodes in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, transmitting, by the one of the first infrastructure equipment and the one or more other infrastructure equipment acting as the relay nodes which determined that the second infrastructure equipment should communicate with the first infrastructure equipment over the second communications path, a route change command to the second infrastructure equipment indicating that the second infrastructure equipment should communicate with the first infrastructure equipment over the second communications path instead of the first communications path, and communicating, by the first infrastructure equipment, with the second infrastructure equipment over the second communications path.

Paragraph 2. A method according to Paragraph 1, wherein the trigger condition comprises a determination, based on the assistance information, that a link quality between two of the infrastructure equipment on the first communications path is below a threshold link quality.

Paragraph 3. A method according to Paragraph 1 or Paragraph 2, wherein the trigger condition comprises a determination, based on the assistance information, that at least one quality of service requirement cannot be guaranteed by at least one of the infrastructure equipment on the first communications path.

Paragraph 4. A method according to any of Paragraphs 1 to 3, wherein the trigger condition comprises a determination, based on the assistance information, that a load at one of the infrastructure equipment on the first communications path is above a threshold load.

Paragraph 5. A method according to any of Paragraphs 1 to 4, wherein the trigger condition comprises a determination, based on the assistance information, that at least one route selection criterion has changed.

Paragraph 6. A method according to any of Paragraphs 1 to 5, wherein one or more of the plurality of infrastructure equipment communicate with one or more others of the infrastructure equipment via the backhaul communications link using one or more beams in which power of each of the signals is focussed, each of the one or more beams being separately identifiable and forming a directional bias with respect to the one or more of the plurality of infrastructure equipment.

Paragraph 7. A method according to any of Paragraphs 1 to 6, wherein if the first communications path is either of a default communications path or a high priority default communications path, the method comprises receiving, at the first infrastructure equipment, less assistance information from the infrastructure equipment on the first communications path than if the first communications path was not either of a default communications path or a high priority communications path.

Paragraph 8. A method according to any of Paragraphs 1 to 7, comprising transmitting, by the first infrastructure equipment, the route change command to the second infrastructure equipment using an F1 interface.

Paragraph 9. A method according to any of Paragraphs 1 to 8, comprising transmitting, by the first infrastructure equipment subsequent to determining that the second infrastructure equipment should communicate with the first infrastructure equipment over the second communications path, signalling associated with the route change command to each of the infrastructure equipment on the first communications path and to each of the infrastructure equipment on the second communications path.

Paragraph 10. A method according to any of Paragraphs 1 to 9, comprising transmitting, by the one of the one or more other infrastructure equipment acting as the relay nodes, the route change command to the second infrastructure equipment using radio resource control, RRC, signalling.

Paragraph 11. A method according to any of Paragraphs 1 to 10, comprising determining, by any of the infrastructure equipment on the first communications path and the infrastructure equipment on the second communications path, that the second infrastructure equipment should communicate with the first infrastructure equipment over the second communications path.

Paragraph 12. A method according to any of Paragraphs 1 to 11, comprising controlling, by any of the infrastructure equipment on the first communications path and the infrastructure equipment on the second communications path, a user plane function, UPF, to be relocated from one of the infrastructure equipment on the first communications path to one of the infrastructure equipment on the second communications path.

Paragraph 13. A method according to any of Paragraphs 1 to 12, comprising creating, by one of the infrastructure equipment on the second communications path, a new access interface between the one of the infrastructure equipment on the second communications path and the core network part of the wireless communications network.

Paragraph 14. A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment acting as a donor node connected to a core network part of the wireless communications network is configured to receive signals representing data from a second of the infrastructure equipment over a first communications path via one or more others of the infrastructure equipment acting as relay nodes, and to receive assistance information from at least one of the second infrastructure equipment and the one or more other infrastructure equipment acting as the relay nodes, wherein one of the first infrastructure equipment and the one or more other infrastructure equipment acting as the relay nodes is configured to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and to transmit a route change command to the second infrastructure equipment indicating that the second infrastructure equipment should communicate with the first infrastructure equipment over the second communications path instead of the first communications path, wherein the first infrastructure equipment is configured to communicate with the second infrastructure equipment over the second communications path.

Paragraph 15. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment acting as a donor node connected to a core network part of the wireless communications network is configured to receive signals representing data from a second of the infrastructure equipment over a first communications path via one or more others of the infrastructure equipment acting as relay nodes, and to receive assistance information from at least one of the second infrastructure equipment and the one or more other infrastructure equipment acting as the relay nodes, wherein one of the first infrastructure equipment and the one or more other infrastructure equipment acting as the relay nodes is configured to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and to transmit a route change command to the second infrastructure equipment indicating that the second infrastructure equipment should communicate with the first infrastructure equipment over the second communications path instead of the first communications path, wherein the first infrastructure equipment is configured to communicate with the second infrastructure equipment over the second communications path.

Paragraph 16. A method of operating a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link wherein the first infrastructure equipment is configured to act as a donor node connected to a core network part of the wireless communications network, the method comprising receiving signals representing data from a second of the infrastructure equipment over a first communications path via one or more others of the infrastructure equipment acting as relay nodes, receiving assistance information from at least one of the second infrastructure equipment and the one or more other infrastructure equipment acting as the relay nodes, determining, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, transmitting a route change command to the second infrastructure equipment indicating that the second infrastructure equipment should communicate with the first infrastructure equipment over the second communications path instead of the first communications path, and communicating with the second infrastructure equipment over the second communications path.

Paragraph 17. A first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link wherein the first infrastructure equipment is configured to act as a donor node connected to a core network part of the wireless communications network, the first infrastructure equipment comprising controller circuitry and transceiver circuitry which are configured in combination to receive signals representing data from a second of the infrastructure equipment over a first communications path via one or more others of the infrastructure equipment acting as relay nodes, to receive assistance information from at least one of the second infrastructure equipment and the one or more other infrastructure equipment acting as the relay nodes, to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, to transmit a route change command to the second infrastructure equipment indicating that the second infrastructure equipment should communicate with the first infrastructure equipment over the second communications path instead of the first communications path, and to communicate with the second infrastructure equipment over the second communications path.

Paragraph 18. Circuitry for a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link wherein the first infrastructure equipment is configured to act as a donor node connected to a core network part of the wireless communications network, the first infrastructure equipment comprising controller circuitry and transceiver circuitry which are configured in combination to receive signals representing data from a second of the infrastructure equipment over a first communications path via one or more others of the infrastructure equipment acting as relay nodes, to receive assistance information from at least one of the second infrastructure equipment and the one or more other infrastructure equipment acting as the relay nodes, to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, to transmit a route change command to the second infrastructure equipment indicating that the second infrastructure equipment should communicate with the first infrastructure equipment over the second communications path instead of the first communications path, and to communicate with the second infrastructure equipment over the second communications path.

Paragraph 19. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising relaying signals representing data from a second of the infrastructure equipment to a first of the infrastructure equipment, the first of the infrastructure equipment acting as a donor node connected to a core network part of the wireless communications network, the signals being relayed over a first communications path via at least the infrastructure equipment acting as the relay node, receiving assistance information from at least the second infrastructure equipment, determining, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and transmitting a route change command to the second infrastructure equipment indicating that the second infrastructure equipment should communicate with the first infrastructure equipment over the second communications path instead of the first communications path.

Paragraph 20. An infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising controller circuitry and transceiver circuitry which are configured in combination to relay signals representing data from a second of the infrastructure equipment to a first of the infrastructure equipment, the first of the infrastructure equipment acting as a donor node connected to a core network part of the wireless communications network, the signals being relayed over a first communications path via at least the infrastructure equipment acting as the relay node, to receive assistance information from at least the second infrastructure equipment, to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and to transmit a route change command to the second infrastructure equipment indicating that the second infrastructure equipment should communicate with the first infrastructure equipment over the second communications path instead of the first communications path.

Paragraph 21. Circuitry for an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising controller circuitry and transceiver circuitry which are configured in combination to relay signals representing data from a second of the infrastructure equipment to a first of the infrastructure equipment, the first of the infrastructure equipment acting as a donor node connected to a core network part of the wireless communications network, the signals being relayed over a first communications path via at least the infrastructure equipment acting as the relay node, to receive assistance information from at least the second infrastructure equipment, to determine, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and to transmit a route change command to the second infrastructure equipment indicating that the second infrastructure equipment should communicate with the first infrastructure equipment over the second communications path instead of the first communications path.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.

[4] 3GPP TTR 38.874 "3$^{rd}$ Generation Partnership Project; Technical Specification Group Radio Access Network; Study on Integrated Access and Backhaul; (Release 15)", 3$^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.

[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

[7] R3-180817, "Topology Management for IAB", Huawei, HiSilicon, 3GPP TSG-RAN WG3 Meeting #99, Athens, Greece, Feb. 26-Mar. 2, 2018.

[8] R3-180816, "Destination Address and Forwarding Path based Routing for IAB", Huawei, 3GPP TSG-RAN WG3 Meeting #99, Athens, Greece, Feb. 26-Mar. 2, 2018.

What is claimed is:

1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising
receiving, at a first of the infrastructure equipment acting as a donor node connected to a core network part of the wireless communications network, signals representing data from a second of the infrastructure equipment over a first communications path via one or more others of the infrastructure equipment acting as relay nodes,
receiving, at the first infrastructure equipment, assistance information from at least one of the second infrastructure equipment and the one or more other infrastructure equipment acting as the relay nodes,
determining, by one of the first infrastructure equipment and the one or more other infrastructure equipment acting as the relay nodes in the case that the assistance information satisfies a trigger condition, that the second infrastructure equipment should communicate with the first infrastructure equipment over a second communications path via one or more other of the infrastructure equipment acting as relay nodes, the second communications path being different to the first communications path,
transmitting, by the one of the first infrastructure equipment and the one or more other infrastructure equipment acting as the relay nodes which determined that the second infrastructure equipment should communicate with the first infrastructure equipment over the second communications path, a route change command to the second infrastructure equipment indicating that the second infrastructure equipment should communicate with the first infrastructure equipment over the second communications path instead of the first communications path, and
communicating, by the first infrastructure equipment, with the second infrastructure equipment over the second communications path,
wherein the trigger condition comprises a determination, based on the assistance information, that a link quality between two of the infrastructure equipment on the first communications path is below a threshold link quality, at least one quality of service requirement cannot be guaranteed by at least one of the infrastructure equipment on the first communications path, a load at one of the infrastructure equipment on the first communications path is above a threshold load, and at least one route selection criterion has changed.

2. The method according to claim 1, wherein one or more of the plurality of infrastructure equipment communicate with one or more others of the infrastructure equipment via the backhaul communications link using one or more beams in which power of each of the signals is focused, each of the one or more beams being separately identifiable and forming a directional bias with respect to the one or more of the plurality of infrastructure equipment.

3. The method according to claim 1, wherein if the first communications path is either of a default communications path or a high priority default communications path, the method comprises receiving, at the first infrastructure equipment, less assistance information from the infrastructure equipment on the first communications path than if the first communications path was not either of a default communications path or a high priority communications path.

4. The method according to claim 1, comprising transmitting, by the first infrastructure equipment, the route change command to the second infrastructure equipment using an F1 interface.

5. The method according to claim 1, comprising transmitting, by the first infrastructure equipment subsequent to determining that the second infrastructure equipment should communicate with the first infrastructure equipment over the second communications path, signaling associated with the route change command to each of the infrastructure equipment on the first communications path and to each of the infrastructure equipment on the second communications path.

6. The method according to claim 1, comprising transmitting, by the one of the one or more other infrastructure equipment acting as the relay nodes, the route change command to the second infrastructure equipment using radio resource control, RRC, signaling.

7. The method according to claim 1, comprising determining, by any of the infrastructure equipment on the first communications path and the infrastructure equipment on the second communications path, that the second infrastructure equipment should communicate with the first infrastructure equipment over the second communications path.

8. The method according to claim 1, comprising controlling, by any of the infrastructure equipment on the first communications path and the infrastructure equipment on the second communications path, a user plane function, UPF, to be relocated from one of the infrastructure equipment on the first communications path to one of the infrastructure equipment on the second communications path.

9. The method according to claim 1, comprising creating, by one of the infrastructure equipment on the second communications path, a new access interface between the one of the infrastructure equipment on the second communications path and the core network part of the wireless communications network.

10. A method of operating a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link wherein the first infrastructure equipment is configured to act as a donor node connected to a core network part of the wireless communications network, the method comprising receiving signals representing data from a second of the infrastructure equipment over a first communications path via one or more others of the infrastructure equipment acting as relay nodes, receiving assistance information from at least one of the second infrastructure equipment and the one or more other infrastructure equipment acting as the relay nodes, determining, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, transmitting a route change command to the second infrastructure equipment indicating that the second infrastructure equipment should communicate with the first infrastructure equipment over the second communications path instead of the first communications path, and communicating with the second infrastructure equipment over the second communications path, wherein the trigger condition comprises a determination, based on the assistance information, that a link quality between two of the infrastructure equipment on the first communications path is below a threshold link quality, at least one quality of service requirement cannot be guaranteed by at least one of the infrastructure equipment on the first communications path, a load at one of the infrastructure equipment on the first communications path is above a threshold load, and at least one route selection criterion has changed.

11. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising relaying signals representing data from a second of the infrastructure equipment to a first of the infrastructure equipment, the first of the infrastructure equipment acting as a donor node connected to a core network part of the wireless communications network, the signals being relayed over a first communications path via at least the infrastructure equipment acting as the relay node, receiving assistance information from at least the second infrastructure equipment, determining, in the case that the assistance information satisfies a trigger condition, that the second infrastructure equipment should communicate with the first infrastructure equipment over a second communications path via one or more other of the infrastructure equipment acting as relay nodes, the second communications path being different to the first communications path, and transmitting a route change command to the second infrastructure equipment indicating that the second infrastructure equipment should communicate with the first infrastructure equipment over the second communications path instead of the first communications path, wherein the trigger condition comprises a determination, based on the assistance information, that a link quality between two of the infrastructure equipment on the first communications path is below a threshold link quality, at least one quality of service requirement cannot be guaranteed by at least one of the infrastructure equipment on the first communications path, a load at one of the infrastructure equipment on the first communications path is above a threshold load, and at least one route selection criterion has changed.

\* \* \* \* \*